United States Patent
Song

(10) Patent No.: US 10,796,688 B2
(45) Date of Patent: Oct. 6, 2020

(54) ELECTRONIC APPARATUS FOR PERFORMING PRE-PROCESSING BASED ON A SPEECH RECOGNITION RESULT, SPEECH RECOGNITION METHOD THEREOF, AND NON-TRANSITORY COMPUTER READABLE RECORDING MEDIUM

(71) Applicant: Samsung Electronics Co., Ltd., Suwon-si, Gyeonggi-do (KR)

(72) Inventor: Myung-suk Song, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 15/761,506

(22) PCT Filed: Oct. 21, 2016

(86) PCT No.: PCT/KR2016/011888
§ 371 (c)(1),
(2) Date: Mar. 20, 2018

(87) PCT Pub. No.: WO2017/069556
PCT Pub. Date: Apr. 27, 2017

(65) Prior Publication Data
US 2018/0268808 A1    Sep. 20, 2018

(30) Foreign Application Priority Data
Oct. 21, 2015  (KR) .......................... 10-2015-0146422

(51) Int. Cl.
*G10L 15/07*  (2013.01)
*G10L 15/22*  (2006.01)
(Continued)

(52) U.S. Cl.
CPC ............. *G10L 15/07* (2013.01); *G10L 15/063* (2013.01); *G10L 15/20* (2013.01); *G10L 15/22* (2013.01);
(Continued)

(58) Field of Classification Search
CPC ................................ G10L 15/20; G10L 21/02
(Continued)

(56) References Cited

U.S. PATENT DOCUMENTS

| 6,937,980 B2 | 8/2005 | Krasny et al. |
| 7,567,678 B2 | 7/2009 | Kong et al. |

(Continued)

FOREIGN PATENT DOCUMENTS

| KR | 10-2003-0001667 | 1/2003 |
| KR | 10-2011-0028095 | 3/2011 |

(Continued)

OTHER PUBLICATIONS

Written Opinion of the International Searching Authority dated Feb. 9, 2017 in International Patent Application No. PCT/KR2016/011888.

(Continued)

*Primary Examiner* — Shaun Roberts
(74) *Attorney, Agent, or Firm* — Staas & Halsey LLP

(57) ABSTRACT

An electronic apparatus is provided. The electronic apparatus according to an embodiment includes an audio input unit configured to receive sound sources from different positions and generate a plurality of voice signals, a pre-processor configured to perform pre-processing of the plurality of voice signals, and a voice recognition unit configured to perform voice recognition using the plurality of voice signals pre-processed by the pre-processor, and in response to a predetermined trigger being detected as a result of the voice recognition, generate trigger information, wherein the (Continued)

pre-processor is further configured to receive feedback on the trigger information generated by the voice recognition unit, change a pre-processing method according to the trigger information, process the plurality of voice signals using the changed pre-processing method, and generate enhanced voice signals.

16 Claims, 10 Drawing Sheets

(51) Int. Cl.
*G10L 15/28* (2013.01)
*G10L 15/06* (2013.01)
*G10L 15/20* (2006.01)
*G10L 21/0208* (2013.01)
*G10L 15/08* (2006.01)
*G10L 21/0216* (2013.01)

(52) U.S. Cl.
CPC .......... *G10L 15/28* (2013.01); *G10L 21/0208* (2013.01); *G10L 21/0216* (2013.01); *G10L 2015/088* (2013.01); *G10L 2015/223* (2013.01); *G10L 2021/02166* (2013.01)

(58) Field of Classification Search
USPC ........................................................ 704/233
See application file for complete search history.

(56) References Cited

U.S. PATENT DOCUMENTS

| | | |
|---|---|---|
| 8,194,872 B2 | 6/2012 | Buck et al. |
| 9,330,673 B2 | 5/2016 | Cho et al. |
| 2004/0064315 A1 | 4/2004 | Deisher et al. |
| 2005/0049864 A1 | 3/2005 | Kaltenmeier et al. |
| 2008/0147397 A1 | 6/2008 | Konig et al. |
| 2011/0066426 A1 | 3/2011 | Lee |
| 2012/0065973 A1* | 3/2012 | Cho .................... G10L 21/00 704/246 |
| 2012/0123772 A1* | 5/2012 | Thyssen .............. G10L 21/0208 704/226 |
| 2013/0282373 A1* | 10/2013 | Visser ................ G10L 21/0208 704/233 |
| 2014/0379345 A1* | 12/2014 | Chung .................. G10L 15/05 704/248 |
| 2015/0206529 A1 | 7/2015 | Kwon et al. |

FOREIGN PATENT DOCUMENTS

| | | |
|---|---|---|
| KR | 10-2012-0027718 | 3/2012 |
| KR | 10-2014-0057018 | 5/2014 |
| KR | 10-2015-0087025 | 7/2015 |
| WO | 2015/092400 | 6/2015 |

OTHER PUBLICATIONS

International Search Report dated Feb. 9, 2017 in International Patent Application No. PCT/KR2016/011888.

* cited by examiner

ELECTRONIC APPARATUS FOR PERFORMING PRE-PROCESSING BASED ON A SPEECH RECOGNITION RESULT, SPEECH RECOGNITION METHOD THEREOF, AND NON-TRANSITORY COMPUTER READABLE RECORDING MEDIUM

CROSS-REFERENCE TO RELATED APPLICATIONS

This application is a U.S. National Stage Application which claims the benefit under 35 U.S.C. § 371 of International Patent Application No. PCT/KR2016/011888, filed on Oct. 21, 2016, which claims the priority benefit of Korean Patent Application No. 10-2015-0146422, filed on Oct. 21, 2015 in the Korean Patent and Trademark Office, the disclosures of which are hereby incorporated by reference in their entirety.

1. FIELD OF THE INVENTION

Devices and methods consistent with what is disclosed herein relate to an electronic apparatus, a speech method thereof and a non-transitory computer readable recording medium, and more particularly, to an electronic apparatus capable of efficiently performing a pre-processing based on a speech recognition result, a speech recognition method thereof and a non-transitory computer readable recording medium.

2. DESCRIPTION OF THE RELATED ART

Conventionally, a user inputs a user command to an electronic apparatus such as a mobile device, display device, etc. by using an input means such as a keyboard, a remote controller, etc. However, voice recognition has been the subject of recent development since the method for inputting a user command varies.

A user may be situated at different angles and distances from an electronic apparatus that performs voice recognition. To provide voice recognition-based human-machine interaction to users at different positions, a microphone-array technique may be used. The microphone-array technique enhances a sound source (a voice) in a target direction and removes sound sources (noises) in other directions by using a plurality of microphones.

An audio signal of which noise is removed and voice is enhanced by a microphone array based pre-processing is transmitted to a voice recognition device so that a trigger/word/sentence recognition device performs voice recognition. The pre-processing is needed since the voice recognition function is significantly reduced as a mismatch between training data and test data increases in the noise environment with a low Signal to Noise Ratio (SNR). Accordingly, various signal processing techniques (or a pre-processing technique) have been used for improving resistance to the noise of the voice recognition device.

For example, in a conventional pre-processing technique, a voice signal is processed based on a method using a noise reduction algorithm. However, in this case, if a pre-processor makes a wrong decision, errors are continuously generated or amplified. For example, a signal processing based voice detector has a problem in failing to distinguish between voice and speech-like noise having a similar frequency characteristic with voice. Accordingly, an electronic apparatus for voice recognition enhances a voice in a totally different direction, thereby resulting in voice distortion.

In the conventional pre-processing technique, a pre-processor and a voice recognition unit operate independently of each other, and after the pre-processor completes the processing of an audio signal, a voice recognition unit starts the operation. Therefore, conventionally, information that could be useful for the pre-processor, which is generated by the voice recognition unit, has not been used. Accordingly, due to the above problem of the conventional technique, errors inevitably occur, and thus a technique for solving the above problem has been in high demand.

The present disclosure to solve the above problem relates to an electronic apparatus capable of receiving feedback on a voice recognition result and enhancing a voice recognition function, a speech recognition method thereof and a non-transitory computer readable recording medium.

SUMMARY

According to an exemplary embodiment, there is provided an electronic apparatus including an audio input unit configured to receive sound sources from different positions and generate a plurality of voice signals, a pre-processor configured to perform pre-processing of the plurality of voice signals, and a voice recognition unit configured to perform voice recognition using the plurality of voice signals pre-processed by the pre-processor, and in response to a predetermined trigger being detected as a result of the voice recognition, generate trigger information, wherein the pre-processor is further configured to receive feedback on the trigger information generated by the voice recognition unit, change a pre-processing method according to the trigger information, process the plurality of voice signals using the changed pre-processing method, and generate enhanced voice signals.

The electronic apparatus may further include a sensor configured to detect an utterance direction by using the plurality of voice signals, wherein the sensor is further configured to receive feedback on the trigger information generated by the voice recognition unit, change a search range and detect an utterance direction within the changed search range.

The sensor may be further configured to, if feedback on the trigger information is not received, detect an utterance direction with respect to all directions, and if feedback on the trigger information is received, detect an utterance direction only with respect to a search range corresponding to a pre-detected utterance direction.

The electronic apparatus may further include a voice detector configured to distinguish between a voice interval and a voiceless interval by using the plurality of voice signals, wherein the voice detector is further configured to receive feedback on the trigger information generated by the voice recognition unit, change a time determined as a voice interval after detecting a voice and distinguish between a voice interval and a voiceless interval based on the changed time determined as a voice interval.

The voice detector may be further configured to, if feedback on the trigger information is not received, distinguish between a voice interval and a voiceless interval by using a time pre-determined as a voice interval, and if feedback on the trigger information is received, distinguish between a voice interval and a voiceless interval by using a second time determined as a voice interval, which is longer than the time pre-determined as a voice interval.

The pre-processor may be further configured to change a pre-processing method for a plurality of voice signals based on the trigger information and whether a voice signal is a voice interval, and generate an enhanced voice signal using the changed pre-processing method.

The pre-processor may include a first element configured to generate a voiceless signal from which a voice is removed by using a plurality of voice signals; and a second element configured to generate an enhanced voice signal by using the generated voiceless signal, wherein the first element is configured to receive feedback on the trigger information generated by the voice recognition unit, change a degree of filtering and generate a voiceless signal.

The second element may be configured to receive feedback on the trigger information, change a degree of noise removal and generate an enhanced voice signal.

The electronic apparatus may further include a display configured to display an image, and a controller configured to control the display to display an image corresponding to the voice recognition result.

The electronic apparatus may further include a communicator configured to transmit the voice recognition result to an external device.

The electronic apparatus may further include a speaker configured to output a voice output event corresponding to the voice recognition result.

According to an exemplary embodiment, there is provided a method for voice recognition of an electronic apparatus including receiving sound sources from different positions and generating a plurality of voice signals, performing pre-processing of the plurality of voice signals, performing voice recognition by using the pre-processed voice signals, in response to a predetermined trigger being detected as a result of the voice recognition, generating trigger information, receiving feedback on the generated trigger information and changing a method for performing the pre-processing according to the trigger information and processing the plurality of voice signals using the changed pre-processing method and generating enhanced voice signals.

The method further include detecting an utterance direction by using the plurality of voice signals, wherein the changing includes receiving feedback on the generated trigger information and changing a search range and detecting an utterance direction within the changed search range.

The receiving of the feedback may include, if feedback on the trigger information is not received, detecting an utterance direction with respect to all directions, and if feedback on the trigger information is received, detecting an utterance direction only with respect to a search range corresponding to a pre-detected utterance direction.

The method may further include distinguishing between a voice interval and a voiceless interval by using the plurality of voice signals, wherein the changing includes receiving feedback on the generated trigger information and changing a time determined as a voice interval after detecting a voice and distinguishing between a voice interval and a voiceless interval by using the changed time determined as a voice interval.

The changing may further include, if feedback on the trigger information is not received, distinguishing between a voice interval and a voiceless interval by using a time pre-determined as a voice interval, and if feedback on the trigger information is received, distinguishing a voice interval and a voiceless interval by using a second time determined as a voice interval, which is longer than the time pre-determined as a voice interval.

The changing may further include changing a preprocessing method of a plurality of voice signals based on the trigger information and whether a voice signal is a voice interval.

The generating of the enhanced voice signals may include generating a voiceless signal from which a voice is removed by using a plurality of voice signals and generating an enhanced voice signal by using the generated voiceless signal, wherein the generating of the voiceless signal includes receiving feedback on the generated trigger information, changing a degree of filtering and generating a voiceless signal.

The generating of the enhanced voice signals may include receiving feedback on the trigger information, changing a degree of noise removal and generating an enhanced voice signal.

According to an exemplary embodiment, there is provided a non-transitory computer readable recoding medium including a program for performing a voice recognition method of an electronic apparatus including receiving sound sources from different positions and generating a plurality of voice signals, performing pre-processing of the plurality of voice signals, performing voice recognition by using the pre-processed voice signals, in response to a predetermined trigger being detected as a result of the voice recognition, generating trigger information, receiving feedback on the generated trigger information and changing a pre-processing method based on the trigger information, and processing the plurality of voice signals using the change pre-processing method and generating enhanced voice signals.

According to the above-described various exemplary embodiments, a voice recognition function of an electronic apparatus may be improved.

DETAILED DESCRIPTION OF EXEMPLARY EMBODIMENTS

The terms used in the embodiments of the present disclosure will be briefly described, and these embodiments will be described in detail. All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The term such as "first" and "second" used in various example embodiments may modify various elements regardless of an order and/or importance of the corresponding elements, and does not limit the corresponding elements. The terms are used simply to distinguish one element from other elements. For example, the first element may be referred to as the second element and similarly, the second element may be referred to as the first element without going beyond the scope of rights of the present disclosure. The term of "and/or" includes combination of a plurality of related item of one of the plurality of related items.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

Figure 1A:
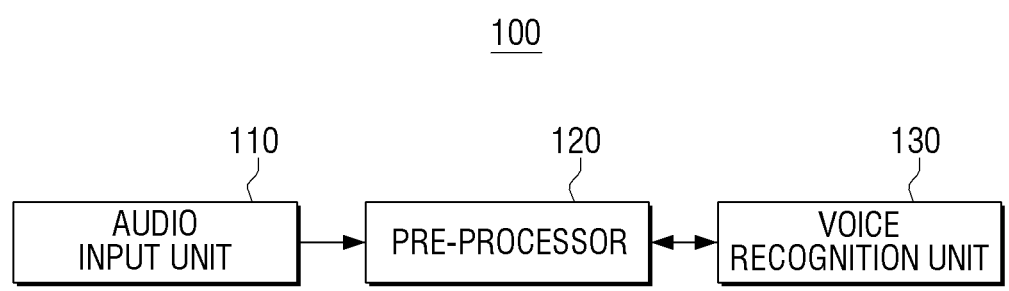
FIG. 1A is a schematic block diagram provided to explain configuration of an electronic apparatus according to an embodiment of the present disclosure.

FIG. 1A is a schematic block diagram provided to explain configuration of an electronic apparatus according to an embodiment of the present disclosure. Referring to FIG. 1A, an electronic apparatus 100 may include an audio input unit 110, a pre-processor 120 and a voice recognition unit 130.

According to an embodiment of the present disclosure, the electronic apparatus 100 may be embodied as all kinds of electronic apparatuses cable of voice recognition, for example, a display device such as a smart TV, a smart phone, a table PC, an audio device, an interactive speech recognition apparatus, navigation device, etc.

The audio input unit 110 may receive a user voice. For example, the audio input unit 110 may be defined by a plurality of microphones, receive sound sources from different positions and generate a plurality of voice signals. The number of channels may be subject to the number of microphones constituting the audio input unit 110. The microphones may be arranged at a predetermined interval or with a predetermined pattern according to its number. For example, when 4 (four) microphones are arranged at the interval of 90 degrees in the periphery of the electronic apparatus 100, the audio input unit 110 may generate four channel voice signals using user voices received through the four microphones.

The pre-processor 120 may perform pre-processing of a plurality of voice signals and generate the pre-processed voice signals. The pre-processing refers to a series of processing performed prior to voice recognition. The pre-processor 120 may directly or indirectly receive feedback on information generated by the voice recognition unit 130 and adaptively change a pre-processing method based thereon.

The pre-processor 120 may include a voice detector 121, a sensor 123 and a beam forming unit 125. The voice detector 121 may detect a speech interval (hereinafter, referred to as a voice interval) including user's utterance and a noise interval (hereinafter, referred to as a voiceless interval) without user's utterance from a voice signal. The sensor 123 may estimate an input direction and a distance of a sound source by using again and delay information of a voice input signal for each channel. The beam forming unit 125 may generate an enhanced voice signal with respect to a target direction by adding gain and delay information to the voice input signal of each channel using a spatial filtering method.

The operation of the pre-processor 120 will be described below in detail with reference to FIGS. 2 and 3.

The voice recognition unit 130 may perform voice recognition using the enhanced voice signal. For example, the voice recognition unit 130 may detect and recognize a trigger word from the input voice signal and generate a voice recognition result of word/sentence from the voice signal after the trigger word is recognized. In response to a predetermined trigger signal being sensed as the voice recognition result, the voice recognition unit 130 may generate trigger information and transmit the information to the pre-processor 120.

The operation of the voice recognition unit 130 will be described below in detail with reference to FIG. 4.

Figure 1B:
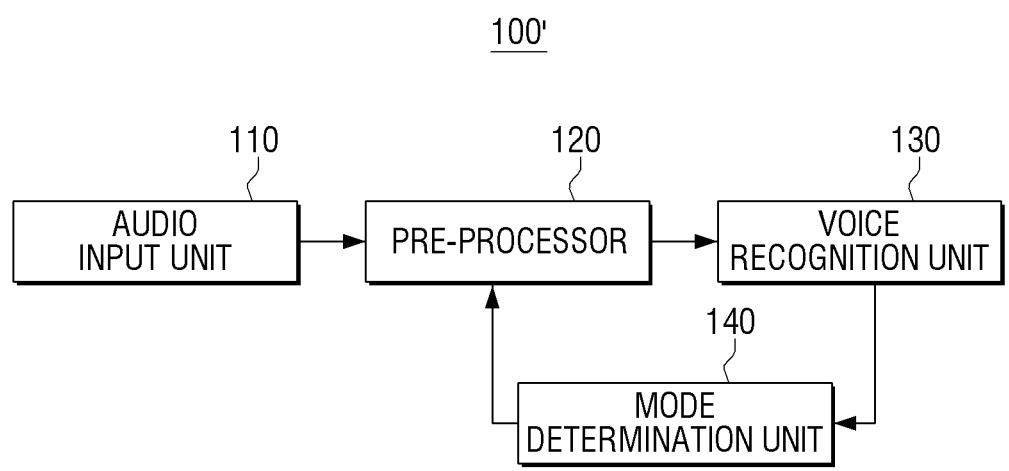
FIG. 1B is a schematic block diagram provided to explain configuration of an electronic apparatus according to another embodiment of the present disclosure.

FIG. 1B is a schematic block diagram provided to explain configuration of an electronic apparatus according to another embodiment of the present disclosure. According to another embodiment, the electronic apparatus 100 may further include a mode determination unit 140. The mode determination unit 140 may be a separate element for performing functions instead of the pre-processor 120 or the voice recognition unit 130.

The mode determination unit 140 may determine a state of the electronic apparatus 100 based on the information generated by the voice recognition unit 130. For example, the mode determination unit 140 may transmit information regarding whether the electronic apparatus 100 awaits to recognize a trigger word, or the electronic apparatus 100 awaits to receive a voice signal for recognizing word/sentence after recognizing the trigger word to the pre-processor 120.

Figure 2:
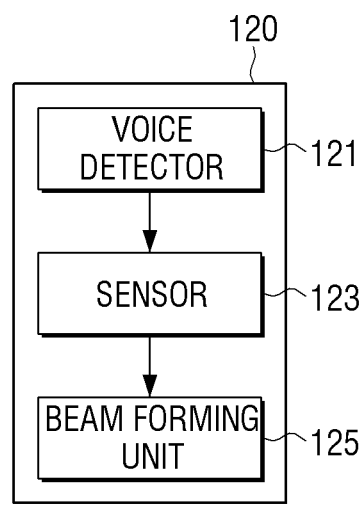
FIG. 2 is a block diagram provided to explain configuration of a pre-processor of an electronic apparatus according to an embodiment of the present disclosure.
Figure 3:
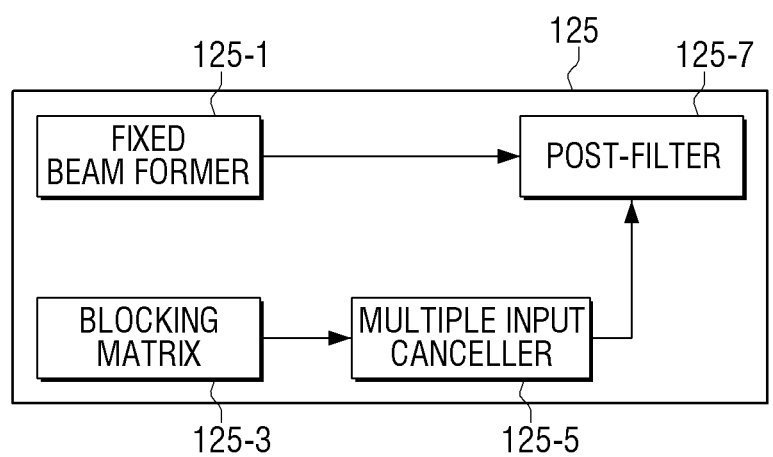
FIG. 3 is a block diagram provided to explain configuration of a beam forming unit of an electronic apparatus according to an embodiment of the present disclosure.

FIG. 2 is a block diagram provided to explain configuration of a pre-processor of an electronic apparatus according to an embodiment of the present disclosure. Referring to FIG. 2, the pre-processor 120 may include the voice detector 121, the sensor 123 and the beam forming unit 125. For example, the pre-processor 120 may be embodied as a single chip such as a Digital Signal Processor (DSP) or a Central Processing Unit (CPU).

The pre-processor 120 may receive feedback on the voice recognition result and change a pre-processing method. For example, the pre-processor 120 may receive feedback on the voice recognition result such as information regarding whether a voice interval is detected and a trigger word is recognized. In addition, the pre-processor 120 may change a pre-processing method such as a length of a hang-over, a voice search range, an adaptation speed of an adaptive filter, etc. based on the fed-back information.

The voice detector 121 may detect a speech interval (hereinafter, referred to as a voice interval) including user's utterance and a noise interval (hereinafter, referred to as a voiceless interval) without user's utterance from a voice signal. For example, the voice detector 121 may distinguish between a voice interval and a voiceless interval in a unit of frame. The voice detector 121 may transmit the generated voice interval information to the sensor 123 and the beam forming unit 125.

The voice detector 121 may adjust a weight value to determine a voice interval using voice recognition information. For example, the voice detector 121 may change a period of time (or the number of frames) determined as a voice interval based on the trigger information after detecting a voice. The voice detector 121 may distinguish between a voice interval and a voiceless interval of the voice signal input based on the changed criteria.

According to an embodiment, the voice detector 120 may change a hang-over interval and adjust a weight value for determining the hang-over interval as a voice interval. The hang-over interval may refer to a period of time in which if a voice is detected, the following frame is determined as a voice interval. For example, if a length of the hang-over interval is determined as being indefinite, the voice detector 121 may detect all frames after the frame determined as a voice interval as the voice interval. However, if the length of the hang-over interval is set to be smallest, the voice detector 121 may determine whether each frame belongs to a voice interval or a voiceless interval. Setting the length of the hang-over interval is considered to be important for reliability of the voice interval information generated by the voice detector 121.

The voice detector 121 may change a period of time determined as a voice interval after detecting a voice based on the fed-back trigger information. The voice detector 121 may distinguish between a voice interval and a voiceless interval using the changed determination time. When a trigger word is recognized by the voice recognition unit 130, user's utterance voice for recognizing word/sentence following the trigger word may likely exist, the voice detector 121 may increase resistance to the noise detected from a voice interval by increasing the length of the hang-over interval. For example, the voice detector 121 may adjust the length of the hang-over interval by following Equation 1.

$$\text{hangover length} = \begin{cases} L_{max}, & \text{trigger ON} \\ L_{min}, & \text{trigger OFF} \end{cases} \qquad \text{[Equation 1]}$$

The Trigger ON means that a trigger word is recognized based on the voice recognition information generated by the voice recognition unit 130, or a recognition score of the trigger word is greater than a predetermined value. In this case, the voice detector 121 may set the length of the hang-over interval determined as the voice interval to be large.

Conversely, the Trigger OFF means that the trigger word is not recognized, or the recognition score of the trigger word is smaller than a predetermined value based on the voice recognition information. In this case, the voice detector 121 may set the length of the hang-over interval to be small and determine whether the hang-over interval is a voice interval.

A score may be a value obtained by quantifying the possibility that a target voice component is present in the frame. The electronic apparatus 100 may experimentally optimize and set a threshold score value that implies that the target voice component is present. The voice recognition unit 130 may compare a score in the frame with a predetermined threshold score value and determine whether a voice interval includes the target voice component.

The voice detector 121 may change a weight value for determining an interval as a voice interval according to the state of the electronic apparatus 100 determined by the mode determination unit 140. For example, if it is determined that the electronic apparatus 100 awaits to recognize a trigger word, the voice detector 121 may increase a weight value to be determined as a voiceless interval. For another example, if it is determined that the electronic apparatus 100 waits for a voice signal to be input for recognizing word/sentence after recognizing the trigger word, the voice detector 121 may increase a weight value to be determined as a voice interval.

The sensor 123 may receive voice signals, voice interval information and voice recognition information and sense an angle from which a voice signal is input. The sensor 123 may sense an utterance direction by using a plurality of voice signals. For example, the sensor 123 may generate target direction angle information in a unit of frame based on the input signal. When the voice signal includes only voice intervals, the target direction angle information for each frame indicates that angles are distributed close to the target direction with small variance. On the contrary, when the voice signal includes a lot of noises, the angle information for each frame may be evenly distributed in all directions.

The sensor 123 may generate the normalized angle information by estimating the direction in which the voice signal is most likely to be inclined using the target direction angle information, the voice interval information, and the voice recognition information on a frame-by-frame basis. The sensor 123 may transmit the generated angle information to the beam forming unit 125.

The sensor 123 may change a search range according to the voice recognition information and detect an utterance direction. For example, the sensor 123 may adjust a weight value on an angle from which a voice signal is input by using the voice recognition information generated by the voice recognition unit 130. The sensor 123 may measure the angle from which the voice signal is input based on the adjusted weight value.

According to an embodiment, a search range may be obtained by the sensor 123 by the following Equation 2.

$$\text{search range} = \begin{cases} \theta_{previous}, & VAD \text{ OFF} \\ \theta_{previous} + \theta_{wide}, & VAD \text{ ON and trigger OFF} \\ \theta_{previous} - \theta_{narrow}, & VAD \text{ ON and trigger ON} \end{cases} \qquad \text{[Equation 2]}$$

The Voice Activity Detection (VAD) OFF refers to the case where the voice interval information generated by the voice detector 121 indicates that the voice signal is determined as a voiceless interval. In this case, the sensor 123 may maintain the previous search interval.

The VAD ON refers to the case where the voice interval information generated by the voice detector 121 indicates that the voice signal is determined as a voice interval. The VAD ON and trigger OFF means that although the voice signal is detected as the voice interval, the trigger word is not recognized, or the recognition score of the trigger word is smaller than a predetermined value based on the voice recognition information. In this case, it is desirable to expand a search range for recognizing a trigger word. The sensor 123 may set a wide range to the left and right of the previously generated search range.

The VAD ON and trigger ON refers to the case where the voice signal is detected as the voice interval and the trigger word is recognized, or the recognition score of the trigger word is greater than a predetermined value. In this case, user utterance may be likely to continue in a direction where the trigger word is detected. The sensor 123 may narrow the previously generated search range to the direction where the trigger word is detected.

For example, when the trigger information is not fed-back, the sensor 123 may detect utterance directions with respect to all directions. Conversely, when the trigger information is fed-back, the sensor 123 may detect only the utterance direction with respect to the search range corresponding to the pre-detected utterance direction.

The beam forming unit 125 may generate a voice signal enhanced with respect to the target direction by applying the gain and delay to the voice input signal for each channel by using the spatial filtering method. FIG. 3 is a block diagram provided to explain configuration of a beam forming unit of an electronic apparatus according to an embodiment of the present disclosure. Referring to FIG. 3, the beam forming unit 125 may include a fixed beam former 125-1, a blocking matrix 125-3, a multiple-input canceller 125-5, and a post-filter 125-7. According to another example, the post-filter 125-7 may be implemented as a separate module.

The beam forming unit 125 may adjust a parameter of an internal module by using voice recognition information in generating an enhanced voice signal.

The fixed beam former 125-1 may receive a voice signal and angle information. The fixed beam former 125-1 may amplify a signal input in the direction where the voice is sensed and generate the amplified voice signal with respect to the target direction.

The blocking matrix 125-3 may receive a voice signal, angle information, voice interval information and trigger recognition information. The blocking matrix 125-3 may remove the signal input in the corresponding angle direction and generate the voice signal from which the target direction signal is removed. The blocking matrix 125-3 may remove the user voice part from the voice signal and generate reference data with respect to the noise. The blocking matrix 125-3 may transmit the reference data with respect to the generated noise to the multiple-input canceller 125-5.

The multiple-input canceller 125-5 may receive a voice signal, voice interval information and trigger recognition information from which the target direction signal generated by the blocking matrix 125-3 is removed. The multiple-input canceller 125-5 may remove noise leakage included in the output of the fixed beam former 125-1 and generate the enhanced voice signal.

Hereinafter, the setting method for an adaptive filter of the blocking matrix 125-3 and the multiple-input canceller 125-5 will be described in detail.

The blocking matrix 125-3 may generate a voice signal from which the target direction signal is removed. The blocking matrix 125-3 may set the adaptive filter to adapt in the direction where the voice is present.

For example, an adaptation filter may be set by the blocking matrix 125-3 by the following Equation 3.

$$\mu_{BM} = \begin{cases} \mu_{min}, & VAD \text{ OFF} \\ \mu_{mid}, & VAD \text{ ON and trigger OFF} \\ \mu_{max}, & VAD \text{ ON and trigger ON} \end{cases} \quad [\text{Equation 3}]$$

The Voice Activity Detection (VAD) OFF refers to the case where the voice interval information generated by the voice detector 121 indicates that a voice signal is determined as a voiceless interval. In this case, the blocking matrix 125-3 may set a step size of the adaptive filter to be smallest. This is because it is more important to prevent over fitting rather than to quickly adapt in the voiceless interval.

The VAD ON refers to the case where the voice interval information generated by the voice detector 121 indicates that a voice signal is determined as a voice interval. The VAD ON and trigger OFF means that the voice signal is detected as the voice interval, but the trigger word is not recognized or the recognition score of the trigger word is smaller than a predetermined value based on the voice recognition information. In this case, the blocking matrix 125-3 may set the step size of the adaptive filter to the middle size.

The VAD ON and trigger ON refers to the case where the voice signal is determined as the voice interval and the trigger word is recognized or the recognition score of the trigger word is greater than a predetermined value. In this case, user utterance may be likely to continue in the direction where the trigger word is detected. The blocking matrix 125-3 may set the step size of the adaptive filter as large as possible and quickly adapt the filter.

The multiple-input canceller 125-5 may generate an enhanced voice signal by removing noise leakage included in the output of the fixed beam former 125-1 using a voice signal from which the target direction signal generated by the blocking matrix 125-3 is removed. The multiple-input canceller 125-5 may adapt the adaptive filter in the interval including only the noises and then output a voice signal from which the noises are removed as much as possible.

For example, an adaptive filter may be set by the multiple-input canceller 125-5 by following the Equation 4.

$$\mu_{MC} = \begin{cases} \mu_{max}, & VAD \text{ OFF} \\ \mu_{mid}, & VAD \text{ ON and trigger OFF} \\ \mu_{mim}, & VAD \text{ ON and trigger ON} \end{cases} \quad [\text{Equation 4}]$$

The VAD (Voice Activity Detection) OFF refers to the case where the voice interval information generated by the voice detector 121 indicates that the voice signal is determined as a voiceless interval. In this case, the multiple-input canceller 125-5 may set the step size of the adaptive filter as large as possible. This is because it is desirable for the multiple-input canceller 125-5 to quickly adapt in the voiceless interval.

The VAD ON refers to the case where the voice interval information generated by the voice detector 121 indicates the voice signal is determined as a voice interval. The VAD ON and trigger OFF means that the voice signal is detected as the voice interval, but the trigger word is not recognized or the recognition score of the trigger word is smaller than a predetermined value based on the voice recognition information. In this case, the multiple-input canceller 125-5 may set the step size of the adaptive filter to the middle size.

The VAD ON and trigger ON means that the voice signal is detected as a voice interval and the trigger word is recognized or the recognition score of the trigger word is greater than a predetermined value. In this case, user utterance may be likely to continue in the direction where the trigger word is detected. The multiple-input canceller 125-5 may set the step size of the adaptive filter to be smallest.

The post-filter 125-7 may remove the noise which is not removed by a spatial filtering method. For example, the post-filter 125-7 may receive a voice signal generated by the fixed beam former 125-1 and amplified in the target direction, an enhanced voice signal generated by the multiple-input canceller 125-5, voice interval information and voice recognition information. The post-filter 125-7 may remove the noise which has not been removed by the fixed beam former 125-1 using the spatial filtering method.

It is desirable for the post-filter 125-7 to situationally adjust the degree of noise removal. For example, the degree of noise removal may set by the post-filter 125-7 by the following Equation 5.

$$\text{aggressiveness} = \begin{cases} \text{over substraction, VAD OFF} \\ \text{mid substraction, VAD ON and trigger OFF} \\ \text{less substraction, VAD ON and trigger ON} \end{cases} \quad [\text{Equation 5}]$$

The Voice Activity Detection (VAD) OFF refers to the case where the voice interval information generated by the voice detector 121 indicates that the voice signal is determined as a voiceless interval. In this case, the post-filter 125-7 may set the degree of noise removal as high as possible. This is because the information necessary for voice recognition may be less likely to be removed along with the noise.

The VAD ON refers to the case where the voice interval information detected by the voice detector 121 indicates that the voice signal is determined as a voice interval. The VAD ON and trigger OFF means that the voice signal is detected as the voice interval, but the trigger word is not recognized or the recognition score of the trigger word is smaller than a predetermined value based on the voice recognition information. In this case, the post-filter 125-7 may set the degree of noise removal to the middle level.

The VAD ON and trigger ON refers to the case where the voice signal is determined as a voice interval and the trigger word is recognized or the recognition score of the trigger word is greater than a predetermined value. In this case, use utterance may be likely to continue in the direction where the trigger word is detected. The post-filter 125-7 may reduce the possibility of voice distortion by reducing the degree of noise removal.

The beam forming unit 125 may use information determined by the mode determination unit 140. For example, when the mode determination unit 140 determines that the electronic apparatus 100 awaits to receive a trigger word, the beam forming unit 125 may set a parameter coefficient for removing noise as large as possible. According to another embodiment, when the mode determination unit 140 determines that the electronic apparatus 100 recognizes a trigger word and awaits to receive a voice signal for recognizing word/sentence, the beam forming unit 125 may set a parameter coefficient to minimize the voice distortion.

Figure 4:
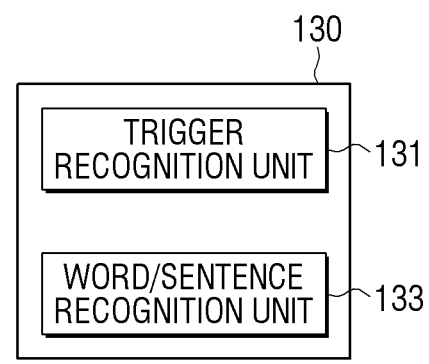
FIG. 4 is a voice recognition unit of an electronic apparatus according to an embodiment of the present disclosure.

FIG. 4 is a voice recognition unit of an electronic apparatus according to an embodiment of the present disclosure. Referring to FIG. 4, a voice recognition unit 130 may include a trigger recognition unit 131 and a word/sentence recognition unit 133.

The trigger recognition unit 131 may detect a trigger signal from the enhanced voice signal generated by the pre-processor 120. The trigger recognition unit 131 may generate trigger information including the trigger recognition score and whether the trigger recognition is completed. The trigger recognition unit 131 may transmit the generated trigger information to the pre-processor 120.

The word/sentence recognition unit 133 may recognize word/sentence from the enhanced voice signal generated by the pre-processor 120. For example, the word/sentence recognition unit 133 may perform the operation only when the trigger recognition is completed by the trigger recognition unit 131. The word/sentence recognition unit 133 may generate information including the word/sentence recognition score and whether the trigger recognition is completed.

Figure 5:
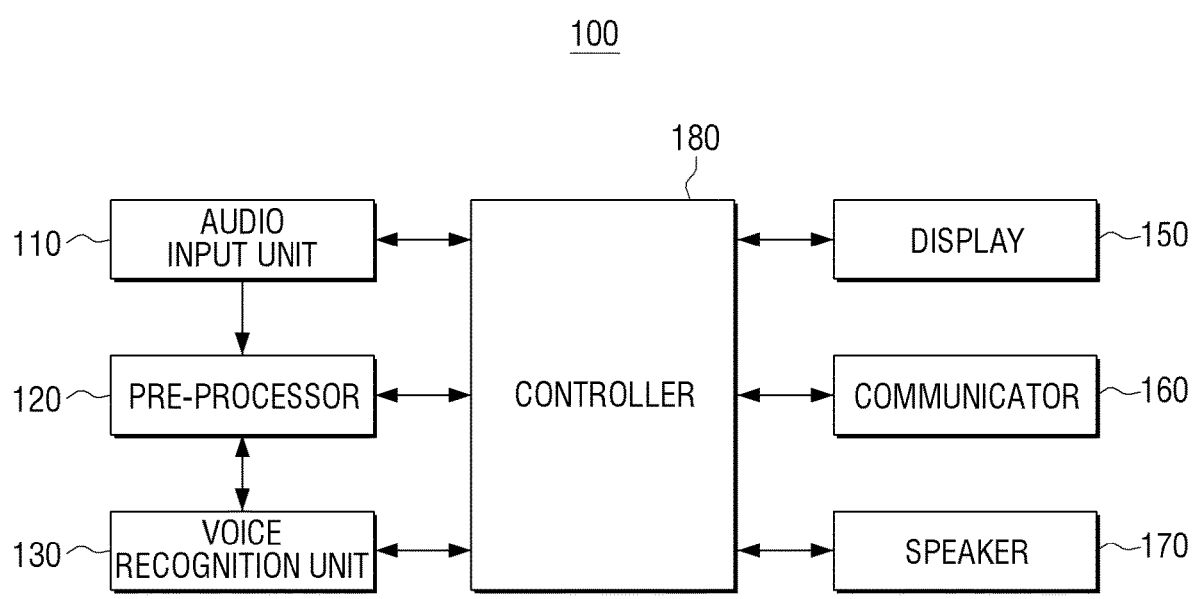
FIG. 5 is a specific block diagram provided to explain configuration of an electronic apparatus according to an embodiment of the present disclosure.

FIG. 5 is a specific block diagram provided to explain configuration of an electronic apparatus according to an embodiment of the present disclosure. According to an embodiment, the electronic apparatus 100 may further include an audio input unit 110, a pre-processor 120, a voice recognition unit 130, a display 150, a communicator 160, a speaker 170 and a controller 180. The repetitive description of the pre-processor 120 and the voice recognition unit 130 will be omitted.

The display 150 may display an image. The display 150 may be implemented with a Liquid Crystal Display (LCD), an Organic Light Emitting Diode (OLED), or a Plasma Display Panel (PDP) and provide a variety of display screens that can be provided through the electronic apparatus 100. The display 150 may display an image corresponding to the voice recognition result of the voice recognition unit 130. For example, the display 150 may display a response message corresponding to the user voice in the form of text or image. For example, when the electronic apparatus 100 receives a user command to change a channel, the voice recognition unit 130 may recognize a channel change command and the controller 180 may control the display 150 to display the changed channel.

The communicator 160 may perform communication with an external device. For example, the external device may be embodied as a cloud server, etc. The communicator 160 may transmit a voice recognition result to the external device and receive corresponding information from the external device. To this end, the communicator 160 may include a variety of communication modules such as a Near Field wireless communication module (not shown), a wireless communication module (not shown), etc. The near field communication module may be a module for performing communication with an external device located at a short distance according to a near field wireless communication protocol such as Bluetooth, ZigBee, etc. In addition, the wireless communication module may be a module for performing communication by being connected to an external network according to a wireless communication protocol such as WiFi, IEEE, or the like. The wireless communication module may further include a mobile communication module that connects to various mobile communication standards such as 3rd Generation (3G), 3rd Generation Partnership Project (3GPP), Long Term Evolution (LTE), etc. and performs communication.

The speaker 170 may output voices. For example, the speaker 170 may output a voice output event corresponding to the voice recognition result. The speaker 170 may make a user to feel that the use is talking to the electronic apparatus 100.

The controller 180 may control overall operations of the electronic apparatus 100. For example, the controller 180 may transmit information between the audio input unit 110, the pre-processor 120 and the voice recognition unit 130.

The configuration of the audio input unit 110 will be described below with reference to FIGS. 6A and 6B.

The audio input unit 110 may be formed as a signal unitary unit on the upper surface, on the front surface, on the side surface, etc. of the electronic apparatus 100 or may be embodied as an additional unit connected to the electronic apparatus 100 via a wired/wireless interface.

Figure 6A:
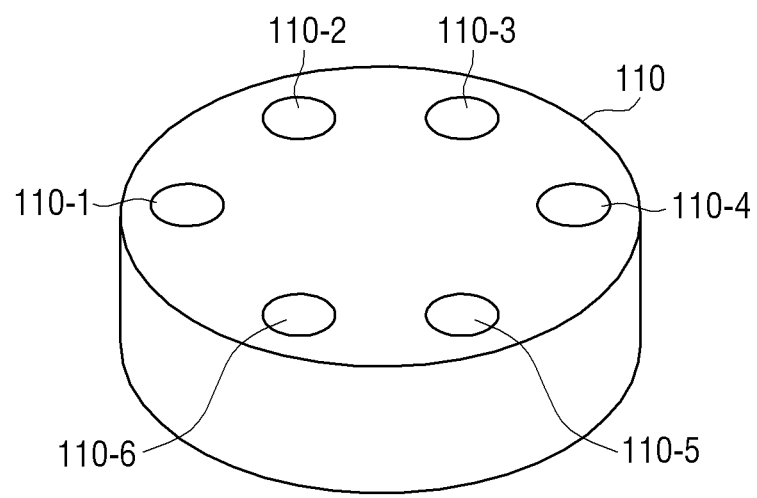
FIGS. 6A and 6B are views illustrating an audio input unit of an electronic apparatus according to various embodiments of the present disclosure.

FIG. 6A is a view illustrating the audio input unit 110 defined by a plurality of microphones and receives sound sources from different positions according to an embodiment. Referring to FIG. 6A, the audio input unit 110 may include 6 (six) microphones 110-1, 110-2, 110-3, 110-4, 110-5 and 110-6 disposed at an angle of 60 degree in the periphery of the electronic apparatus 100. The audio input unit 110 may generate six channel voice signals based on user voices received through the six microphones 110-1, 110-2, 110-3, 110-4, 110-5 and 110-6. The sensor 123 may estimate a direction from which a sound source is input and a distance from the sound source by using the gain and delay information of the voice input signal for each channel.

However, the audio input unit 110 is not limited to having a plurality of microphones as illustrated in FIG. 6A. The audio input unit 110 may be provided outside or inside the electronic apparatus 100, and the number of microphones is not limited to six.

As described above, the audio input unit 110 shown in FIG. 6A is described as a unit separately provided from the electronic apparatus 100, but the audio input unit 110 of FIG. 6A is integrally formed on one side of the electronic apparatus 100.

Figure 6B:
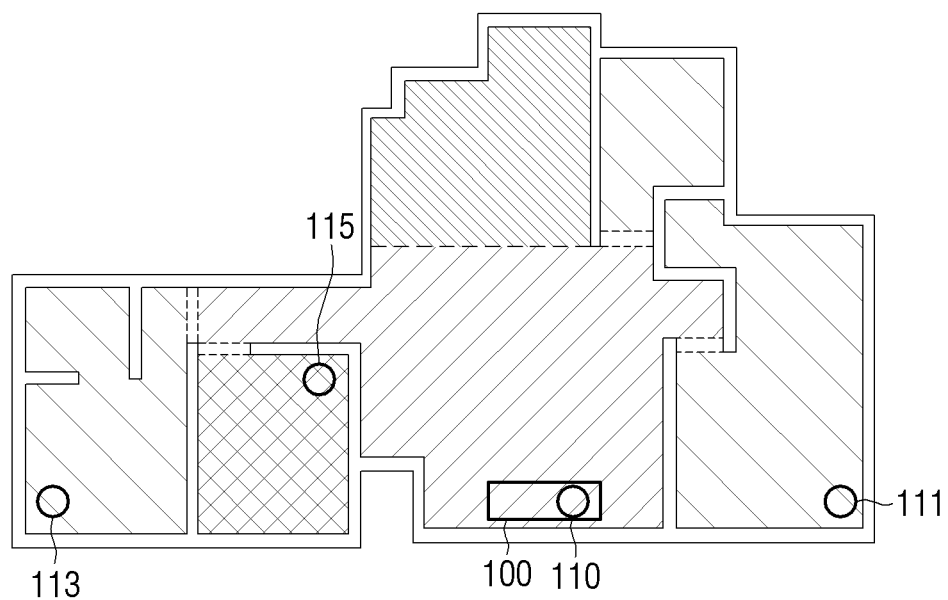

FIG. 6B is a view provided to explain a method for inputting a sound source using a plurality of external audio input units according to an embodiment. Referring to FIG. 6A, the electronic apparatus 100 may be arranged in one area of the house. For convenience of explanation, the audio input unit 110 included in the electronic apparatus 100 will be referred to as a main audio input unit, and sub-audio input units 111, 113 and 115 additionally provided apart from the electronic apparatus 100 will be referred to as a sub-audio input unit.

For example, the sub-audio input units 111, 113 and 115 may be arranged in another area of the house. The electronic apparatus 100 may be connected to the plurality of sub-audio input units 111, 113 and 115 via a network, thereby creating Internet of Things (IoT) environment. Specifically, the plurality of apparatuses may be connected to each other via home network, Bluetooth, WiFi, WiFi direct, etc. Each of the plurality of sub-audio input units 111, 113 and 115 may be defined by a plurality of microphones and receive sound sources from different positions in the same manner as the main audio input unit 110.

If a sound source is input to one of the main audio input unit 110 and the plurality of sub-audio input units 111, 113 and 115, the electronic apparatus 100 may stop the other audio input units from receiving a sound source.

For example, assuming a user is situated in the room where the sub-audio input unit 113 is arranged, in response to a user voice being input to the sub-audio input unit 113 in neighbor of the user, the electronic apparatus 100 may not process the sound sources input from the other audio input units 110, 111 and 115. This is because the sound sources input to the other audio input units 110, 111 and 115 may be noises, not the sound sources input by the user.

The sub-audio input unit 113 in neighbor of the user may generate the user voice into voice signals of a plurality of channels by using a plurality of microphones provided therein. The sub-audio input unit 113 may transmit the generated voice signals of the plurality of channels to the electronic apparatus 100 connected to the network. The sensor 123 of the electronic apparatus 100 may estimate the direction where the user is situated and the distance from the sub-audio input unit 113 based on the gain and delay information of the voice input signal for each channel.

According to another embodiment, the electronic apparatus 100 may determine an area where the user is situated by using an internal camera, a CCTV, etc. in the IoT environment. The electronic apparatus 100 may enable an audio input unit arranged in the area where the user is situated.

Figure 7:
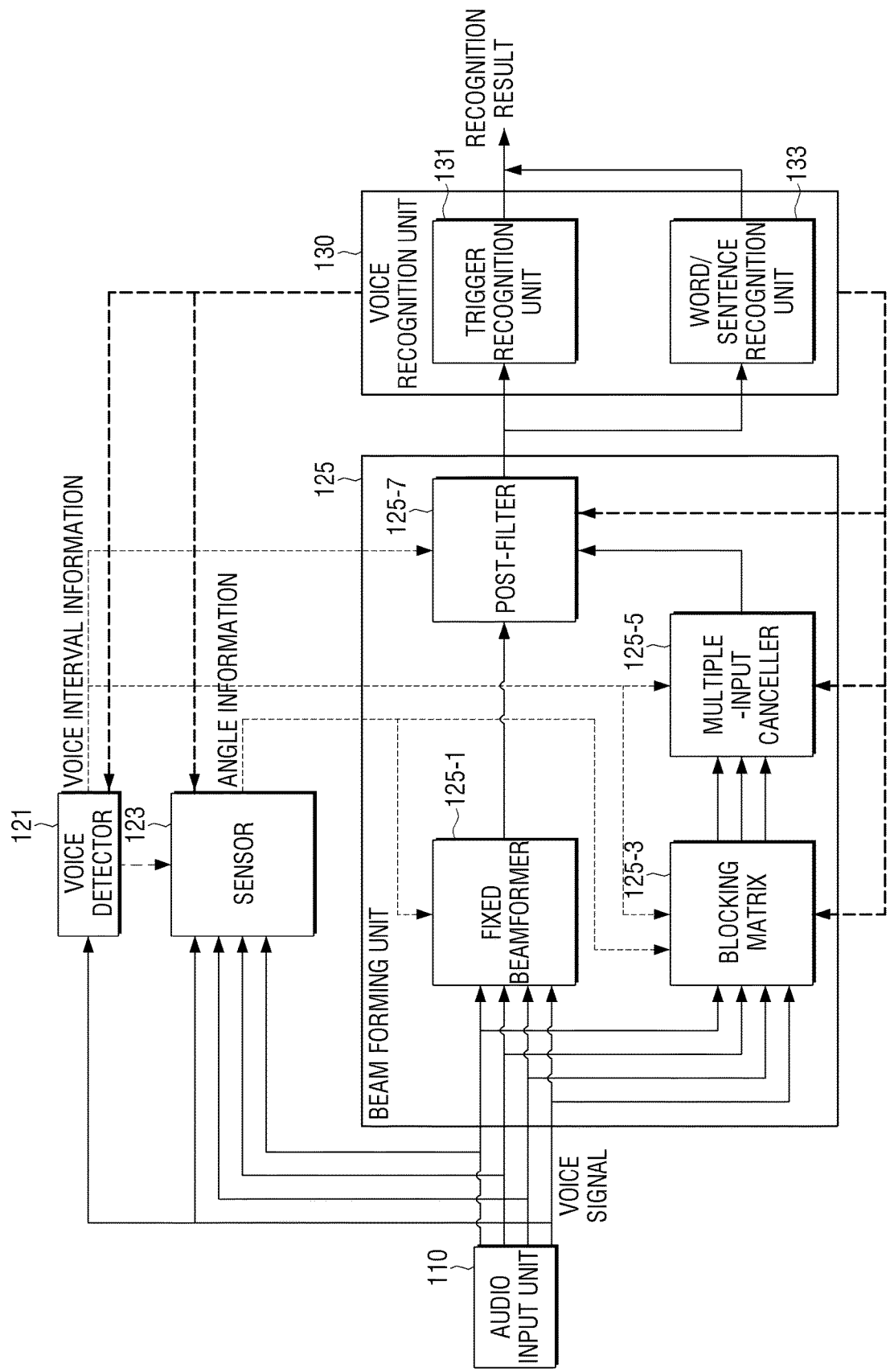
FIG. 7 is a view provided to explain transmission of signals and information in an electronic apparatus according to an embodiment of the present disclosure.

FIG. 7 is a view provided to explain transmission of signals and information in the electronic apparatus 100 according to an embodiment of the present disclosure. Transmission paths of signals and information between the audio input unit 110, the pro-processor 120 and the voice recognition unit 130 will be described with reference to FIG. 7.

The audio input unit 110 may receive sound sources from different positions and generate a plurality of voice signals. The voice signal generated by the audio input unit 110 may be input to the voice detector 121, the sensor 123, the fixed beam former 125-1 and the blocking matrix 125-3.

The voice detector 121 may distinguish between a voice interval and a voiceless interval by using the input voice signal and generate voice interval information. The generated voice interval information may be transmitted to the sensor 123, the blocking matrix 125-3, the multiple-input canceller 125-5 and the post-filter 125-7.

The sensor 123 may sense an utterance direction using the input voice signal. The sensor 123 may generate angle information and transmit the information to the fixed beam former 125-1 and the blocking matrix 125-3.

The fixed beam former 125-1 may perform spatial filtering by using the input voice signal and the angle information. The fixed beam former 125-1 may transmit the voice signal enhanced by the spatial filtering to the post-filter 125-7.

The blocking matrix 125-3 may remove the voice in the target direction from the input voice signal and transmit the voice signal from which the voice is removed to the multiple-input canceller 125-5. The blocking matrix 125-3 may set an adaptation speed of the adaptive filter based on the voice interval information and trigger information.

The multiple-input canceller 125-5 may receive the voice signal from which the voice in the target direction is removed from the blocking matrix 125-3. The multiple-input canceller 125-5 may remove noise leakage in other directions than the target direction based thereon. The multiple-input canceller 125-5 may set an adaptation speed of the adaptive filter based on the voice interval information and the trigger information.

The pose-filter 125-7 may remove the noise which has not been removed by the spatial filtering method. The post-filter 125-7 may adjust the degree of noise removal by using the voice interval information and the trigger information. The post-filter 125-7 may transmit the voice signal enhanced by the noise removal to the voice recognition unit 130.

The voice recognition unit 130 may generate information to be used by the pre-processor 120 from the voice recognition result. For example, the trigger recognition unit 131 may generate trigger information on whether a trigger word is input. The trigger recognition unit 131 may transmit feedback on the trigger information to the voice detector 121, the sensor 123, the blocking matrix 125-3, the multiple-input canceller 125-5 and the post-filter 125-7.

As described above, according to various embodiments, the electronic apparatus 100 may estimate the state of the electronic apparatus 100 or the user based on the voice recognition result, and the pre-processor may vary a voice signal pre-processing method based on the estimated information and increase a voice recognition success rate.

Figure 8:
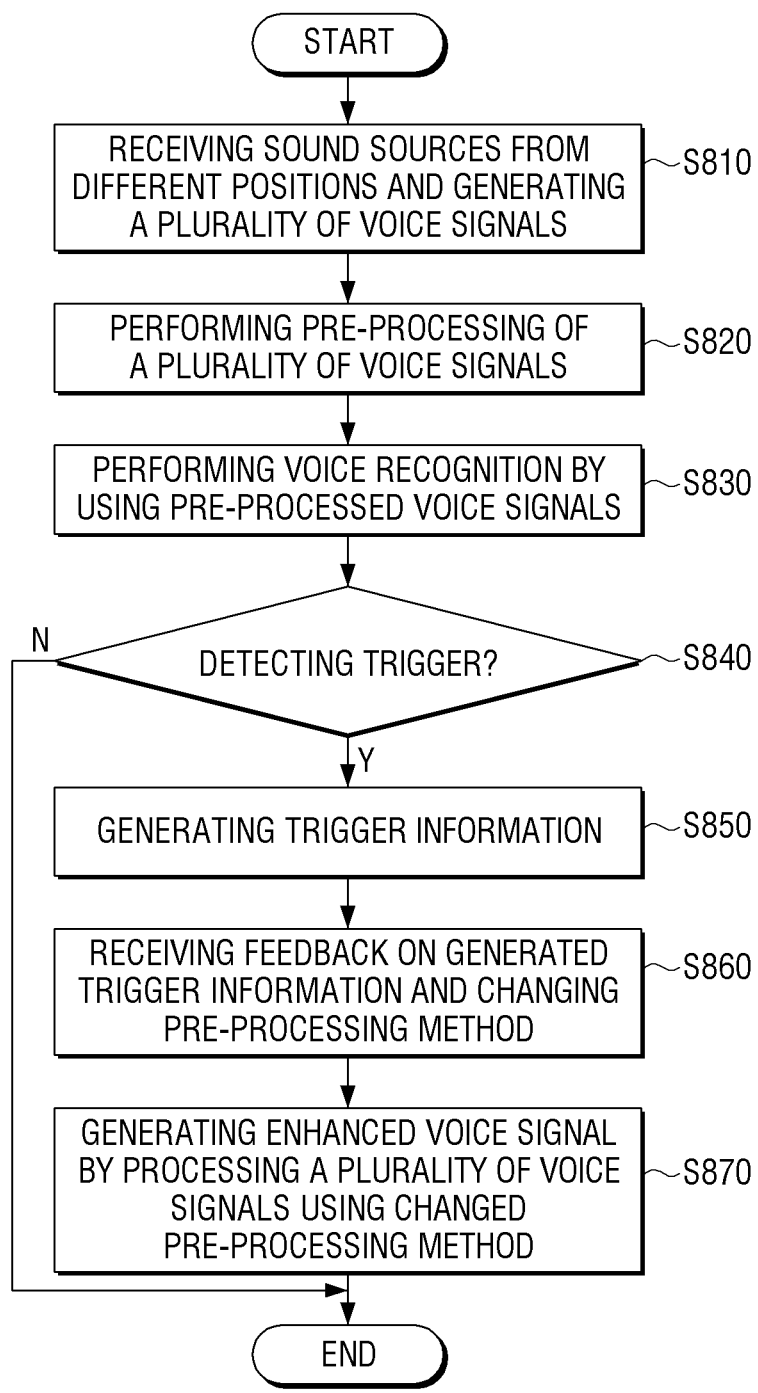
FIG. 8 is a flowchart provided to explain a method for voice recognition of an electronic apparatus according to an embodiment of the present disclosure.

FIG. 8 is a flowchart provided to explain a method for voice recognition of an electronic apparatus according to an embodiment of the present disclosure.

Referring to FIG. 8, the electronic apparatus 100 may receive sound sources from different positions and generate a plurality of voice signals at step S810. For example, the electronic apparatus 100 may generate multichannel voice signals through a micro-array defined by a plurality of microphones. The electronic apparatus 100 may determine the direction where a sound source is uttered and the distance from the uttered sound source based on the difference in time when sound sources are input to the plurality of microphones.

The electronic apparatus 100 may perform a pre-processing of a plurality of input voice signals at step S820. The electronic apparatus 100 may perform voice recognition by using the pre-processed voice signal at step S830.

The electronic apparatus 100 may determine whether a predetermined trigger is sensed in the voice recognition result at step S840. If the predetermined trigger is sensed as the voice recognition result at step S840-Y, the electronic apparatus 100 may generate trigger information at step S850. For example, the trigger information may be information regarding whether the trigger is recognized and a trigger recognition score.

The electronic apparatus 100 may feedback the generated trigger information and change a method for performing a pre-processing at step S860. For example, the electronic apparatus 100 may change a period of time for determining a voice interval after detecting a voice. According to another embodiment, the electronic apparatus 100 may change a search angle range for sensing an utterance direction. According to another embodiment, the electronic apparatus 100 may change an adaptation speed of an adaptive filter or the degree of noise removal.

The electronic apparatus 100 may process a plurality of voice signals using the changed pre-processing method and generate the enhanced voice signal at step S870. The change to the pre-processing method may include at least one of a change to the period of time for determining a voice interval, a change to the search angle range, a change to the adaptation speed of the adaptive filter, and a change to the degree of noise removal.

According to various embodiments, the voice recognition information may be used for estimating the state of the electronic apparatus and the state of the user. Accordingly, the success rate of voice recognition may be increased by adjusting the weight values given to the probability of the user to utter a voice, the position of the user, the strength of the user voice etc.

The above-described methods may be implemented in the form of program instructions that can be executed through various computer means and recorded in a computer-readable medium. The computer-readable medium may include program instructions, data files, data structures, and the like, alone or in combination. The program instructions recorded on the medium may be those specially designed and constructed for the present disclosure or may be available to those skilled in the art of computer software. Examples of computer-readable recording medium include magnetic media such as hard disks, floppy disks, and magnetic tapes, optical media such as CD-ROMs and DVDs, magneto-optical media such as floppy disks and hardware devices specifically configured to store and execute program instructions such as ROM, RAM, flash memory, and the like. Examples of program instructions include machine language code such as those generated by a compiler as well as high-level language code that can be executed by a computer using an interpreter or the like. The above hardware devices may be configured to operate as one or more software modules to perform the operations of the present disclosure, and vice versa.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. An electronic apparatus, comprising:
   an audio input unit configured to receive sound sources from different positions and provide a plurality of voice signals;
   a pre-processor configured to process the plurality of voice signals based on a pre-processing method; and
   a voice recognition unit configured to perform voice recognition using the plurality of voice signals processed by the pre-processor, and based on a predetermined trigger being identified as a result of the voice recognition, provide trigger information,
   wherein the pre-processor is configured to, based on the trigger information being received from the voice recognition unit, change the pre-processing method and process the plurality of voice signals using the changed pre-processing method, and
   wherein the changing the pre-processing method comprises:
      increasing a first weight value for identifying the plurality of voice signals as a voice interval before the trigger information is received, and
      increasing a second weight value for identifying the plurality of voice signals as a voiceless interval after the trigger information is received.

2. The electronic apparatus as claimed in claim 1, further comprising:
   a sensor configured to detect an utterance direction by using the plurality of voice signals,
   wherein the sensor is further configured to receive feedback on the trigger information provided by the voice recognition unit, change a search range and detect an utterance direction within the changed search range.

3. The electronic apparatus as claimed in claim 2, wherein the sensor is further configured to, if feedback on the trigger information is not received, detect an utterance direction with respect to all directions, and if feedback on the trigger information is received, detect an utterance direction only with respect to a search range corresponding to a pre-detected utterance direction.

4. The electronic apparatus as claimed in claim 1, further comprising:
   a voice detector configured to distinguish between a voice interval and a voiceless interval by using the plurality of voice signals,
   wherein the voice detector is further configured to receive feedback on the trigger information provided by the voice recognition unit, change a time determined as a voice interval after detecting a voice and distinguish between a voice interval and a voiceless interval based on the changed time determined as a voice interval.

5. The electronic apparatus as claimed in claim 4, wherein the voice detector is further configured to, if feedback on the trigger information is not received, distinguish between a voice interval and a voiceless interval by using a time pre-determined as a voice interval, and if feedback on the trigger information is received, distinguish between a voice interval and a voiceless interval by using a second time determined as a voice interval, which is longer than the time pre-determined as a voice interval.

6. The electronic apparatus as claimed in claim 4, wherein the pre-processor is further configured to change a pre-processing method for a plurality of voice signals based on the trigger information and whether a voice signal is a voice interval, and provide an enhanced voice signal using the changed pre-processing method.

7. The electronic apparatus as claimed in claim 1, wherein the pre-processor comprises:
 a first element configured to provide a voiceless signal from which a voice is removed by using a plurality of voice signals; and
 a second element configured to provide an enhanced voice signal by using the provided voiceless signal,
 wherein the first element is configured to receive feedback on the trigger information provided by the voice recognition unit, change a degree of filtering and provide a voiceless signal.

8. The electronic apparatus as claimed in claim 7, wherein the second element is configured to receive feedback on the trigger information, change a degree of noise removal and provide an enhanced voice signal.

9. The electronic apparatus as claimed in claim 1, further comprising:
 a display configured to display an image; and
 a controller configured to control the display to display an image corresponding to the voice recognition result.

10. The electronic apparatus as claimed in claim 1, further comprising:
 a communicator configured to transmit the voice recognition result to an external device.

11. The electronic apparatus as claimed in claim 1, further comprising:
 a speaker configured to output a voice output event corresponding to the voice recognition result.

12. A method for voice recognition of an electronic apparatus, comprising:
 receiving sound sources from different positions and providing a plurality of voice signals;
 processing the plurality of voice signals based on a pre-processing method;
 performing voice recognition by using the processed plurality of voice signals;
 based on a predetermined trigger being identified as a result of the voice recognition, providing trigger information;
 receiving the trigger information and changing the pre-processing method corresponding to the trigger information; and
 processing the plurality of voice signals using the changed pre-processing method and providing enhanced voice signals,
 wherein the changing the pre-processing method comprises:
  increasing a first weight value for identifying the plurality of voice signals as a voice interval before the trigger information is received, and
  increasing a second weight value for identifying the plurality of voice signals as a voiceless interval after the trigger information is received.

13. The method as claimed in claim 12, further comprising:
 detecting an utterance direction by using the plurality of voice signals,
 wherein the changing comprises:
 receiving feedback on the provided trigger information and changing a search range; and
 detecting an utterance direction within the changed search range.

14. The method as claimed in claim 13, wherein the receiving of the feedback comprises, if feedback on the trigger information is not received, detecting an utterance direction with respect to all directions, and if feedback on the trigger information is received, detecting an utterance direction only with respect to a search range corresponding to a pre-detected utterance direction.

15. The method as claimed in claim 12, further comprising:
 distinguishing between a voice interval and a voiceless interval by using the plurality of voice signals,
 wherein the changing comprises:
 receiving feedback on the provided trigger information and changing a time determined as a voice interval after detecting a voice; and
 distinguishing between a voice interval and a voiceless interval by using the changed time determined as a voice interval.

16. A non-transitory computer readable recording medium storing a program to implement a method for voice recognition of an electronic apparatus, the method comprising:
 receiving sound sources from different positions and providing a plurality of voice signals;
 performing pre-processing of the plurality of voice signals;
 performing voice recognition by using the pre-processed voice signals;
 in response to a predetermined trigger being detected as a result of the voice recognition, providing trigger information;
 receiving feedback on the provided trigger information and changing a method for performing the pre-processing according to the trigger information; and
 processing the plurality of voice signals using the changed pre-processing method and providing enhanced voice signals,
 wherein the changing the method for performing the pre-processing comprises:
  increasing a first weight value for identifying the plurality of voice signals as a voice interval before the trigger information is received, and
  increasing a second weight value for identifying the plurality of voice signals as a voiceless interval after the trigger information is received.

* * * * *